United States Patent Office 3,198,174
Patented Aug. 3, 1965

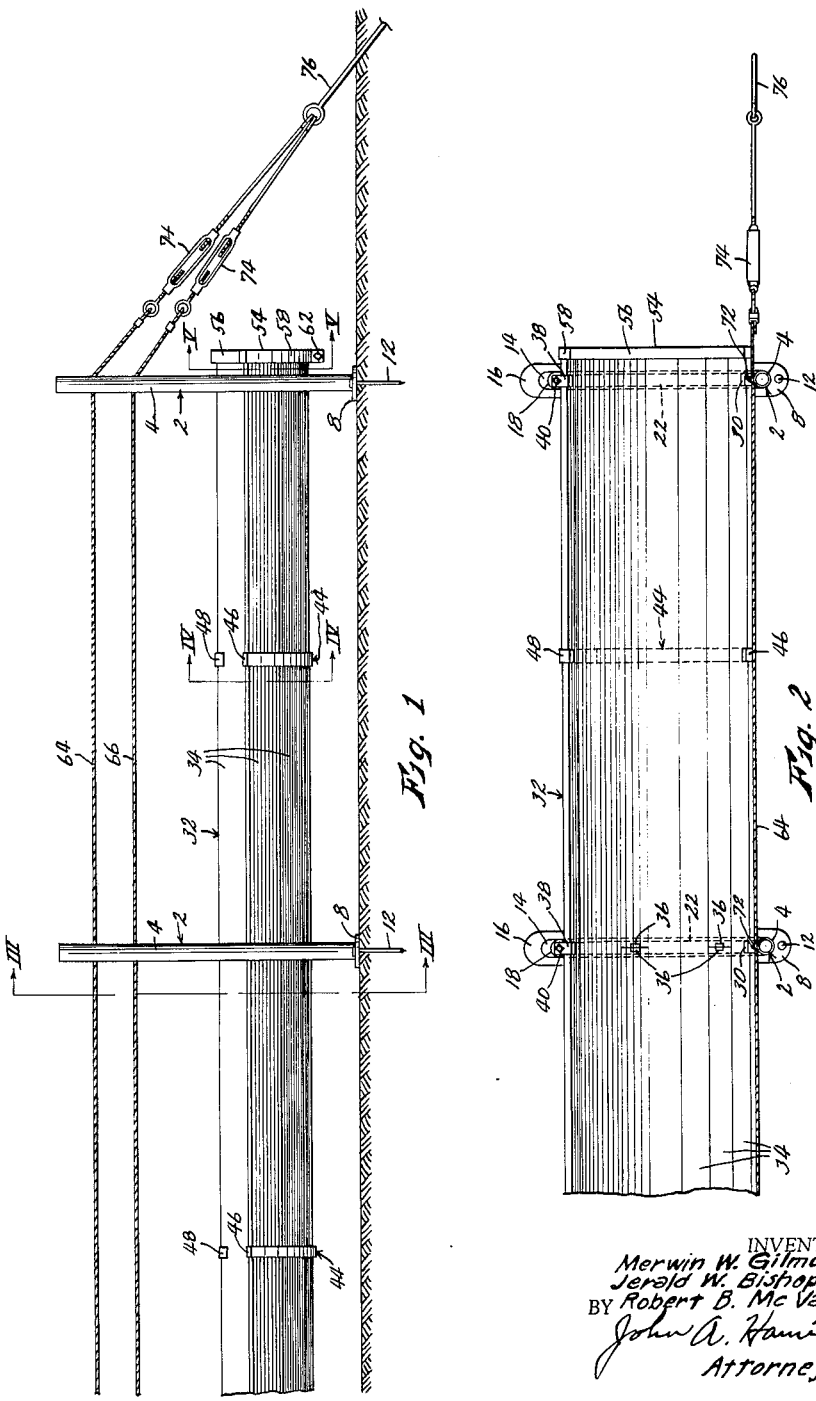

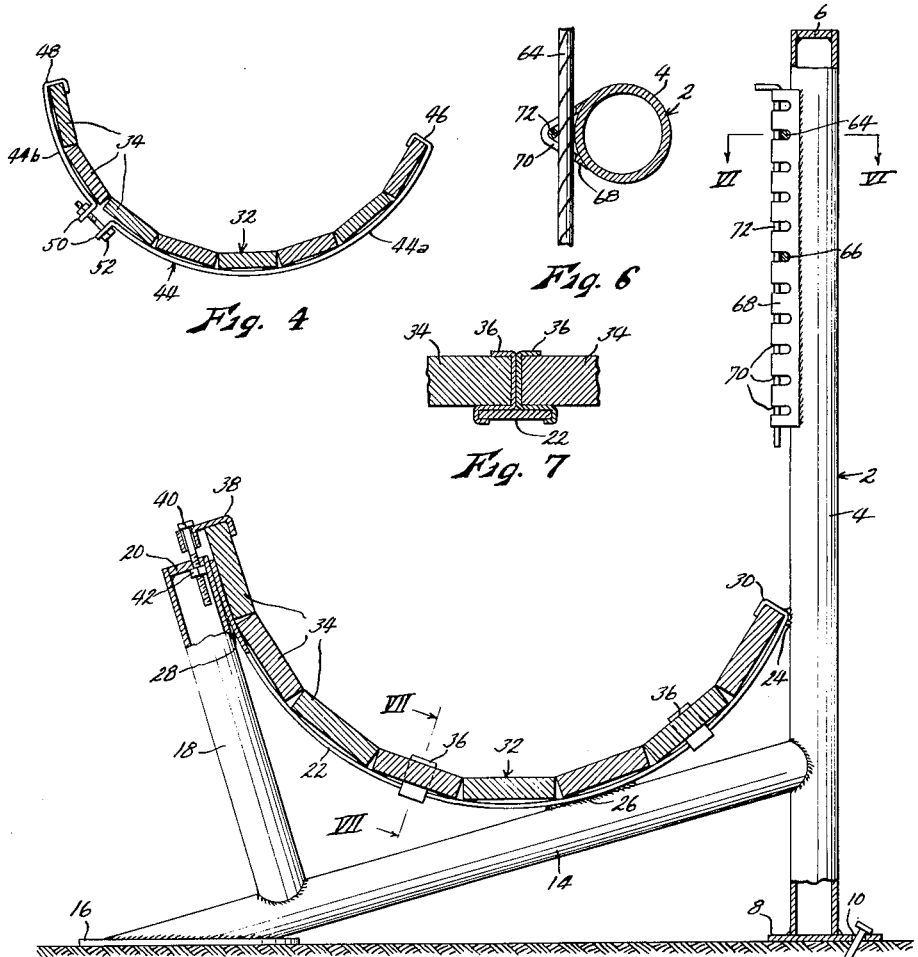
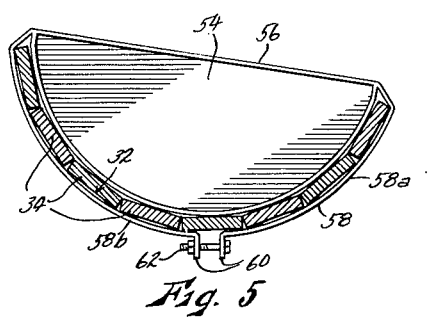

3,198,174
LIVESTOCK FEEDING APPARATUS
Merwin W. Gilmore, Jerald W. Bishop, and Robert B. McVay, Clay Center, Kans., assignors to Gilmore-Tatge Manufacturing Co., Inc., Clay Center, Kans., a corporation of Kansas
Filed Oct. 12, 1962, Ser. No. 230,111
1 Claim. (Cl. 119—61)

This invention relates to new and useful improvements in apparatus for feeding livestock, and has particular reference to what may be termed a "fence-line" feeder constituting a fence-line barrier with an elongated feed trough arranged along one side thereof. The animals may extend their heads and necks through the barrier to gain access to the feed in the trough, but are prevented by the barrier from climbing into the trough which could result in contamination of the feed or wastage thereof by spilling it out of the trough on the ground. The barrier also limits the animals to access to the trough from one side only, leaving the other side of the trough accessible to a truck or the like for delivering feed to the trough. This latter is quite important where the trough may be a half mile long or more, as is not uncommon in large cattle feeder operations.

An important object of the present invention is the provision of a feeding apparatus of the general character described consisting of a series of any number of identical frame members which may be independently installed in spaced relation in a line of any length, said frame members in turn supporting the trough and barrier members.

Another object is the provision of a feeding apparatus of the character described wherein the trough member may be formed of commonly available straight boards or planks in standard lengths, and wherein the barrier members may be formed of commonly available wire cable.

Other objects are simplicity and economy of construction, efficiency and dependability of operation, ease and rapidity of installation, and ready adjustabiliy for use by animals of different sizes.

With these objects in view, as well as other objects which will appear in the course of the specification, reference will be had to the accompanying drawing, wherein:

FIG. 1 is a front elevational view of a section of a livestock feeding apparatus embodying the present invention, FIG. 2 is a top plan view of the feeding apparatus as shown in FIG. 1, FIG. 3 is an enlarged sectional view taken on line III—III of FIG. 1, with portions broken away, FIG. 4 is an enlarged sectional view taken on line IV—IV of FIG. 1, FIG. 5 is an enlarged sectional view taken on line V—V of FIG. 1, FIG. 6 is an enlarged sectional view taken on line VI—VI of FIG. 3, and FIG. 7 is an enlarged fragmentary sectional view taken on line VII—VII of FIG. 3.

Like reference numerals apply to similar parts throughout the several views, and the numeral 2 applies generally to each of a series of frame members adapted to be disposed in a series of any desired length at any desired spacing, for example at a spacing of ten feet between successive frames. Each of said frames comprises a vertical post 4 which may be tubular and is provided at its upper end with a cap 6 (see FIG. 3) welded or otherwise fixed therein to prevent the entry of rain or the like. Said post is provided at its lower end with an enlarged foot 8 adapted to rest on the ground, said foot having a hole 10 formed therein for receiving a stake 12 adapted to be driven into the ground, whereby the post is prevented from shifting its position relative to the ground. The frames are normally positioned so that posts 4 are disposed in a generally straight line.

Welded or otherwise affixed to each post 4, adjacent the lower end thereof, is one end of an inclined support member 14, which may also be tubular, said support member extending from post 4 at right angles to the line of posts, and being inclined downwardly to engage the ground at its outer end, being provided at its outer end with an enlarged foot 16. An upright 18 is welded at its lower end to support member 14 adjacent the outer end thereof, in spaced relation from post 4, and extends upwardly therefrom. Said upright may also be tubular, and is provided at its upper end with a cap 20 affixed therein.

A cradle member 22 consisting of a metal strap bent into a generally arcuate, upwardly concave form, is carried by each frame, being welded at its forward end to post 4, as indicated at 24, welded at its midportion to support member 14 as indicated at 26, and being welded at its rearward end to the upper portion of upright 18, as indicated at 28. The forward end portion of the strap forming the cradle is bent to form a hook 30 opening tangentially inwardly along the cradle.

The trough, indicated generally by the numeral 32 is formed by a plurality of wooden planks 34 laid in edge to edge relation in the cradles 22 of frames 2, and extending between the frames. The frames are preferably spaced ten feet apart, so that standard twenty foot planks may be used without cutting or wastage, or the planks may be cut to fit. In any event, each plank must end directly above the cradle 22 of each frame, and the planks are secured to the cradle by a pair of S-shaped hooks 36 as best shown in FIG. 7. Said hooks are formed of sheet metal, one bend thereof engaging the end of a plank, and the reverse bend thereof engaging an edge of the strap forming the cradle. Thus the ends of the planks are prevented from warping away from the cradle, and the planks are further secured against longitudinal movement.

The upper edge of the forwardmost plank 34 is engaged in hook 30. The upper edge of the rearwardmost plank 34 is engaged by a hook 38 which is secured adjustably by a screw 40 to a nut 42 (see FIG. 3) affixed to cap 20 of upright 18. By tightening said screw, planks 34 are pressed firmly together in edge to edge relation between hooks 30 and 38, and are held down firmly in cradle 22.

It may in some cases be desired to provide means for maintaining the planks in proper relative alignment at points intermediate frames 2. Such a means is shown at 44, comprising a flexible steel strap passing under the trough, having a hook 46 formed at its forward end and engaging the upper edge of forwardmost plank 34, and having a hook 48 formed at its rearward end and engaging the upper edge of the rearwardmost plank 34. As best shown in FIG. 4, strap 44 is divided into two sections 44a and 44b with their contiguous end portions bent outwardly to form parallel, spaced apart tabs 50, said tabs being connected by bolt 52 whereby the strap may be drawn tight.

Each end of trough 32 is closed by a sheet metal wall 54 of generally segmental shape, as best shown in FIG. 5, said wall being provided with an inturned flange 56. The curved lower edge of said wall rests on the upper surfaces of trough planks 34, and conforms generally to the internal contour of the trough. The opposite ends of a flexible steel strap 58 are affixed respectively to the upper corners of end wall 54, said strap passing under the trough. As best shown in FIG. 5, strap 58 is divided into two parts 58a and 58b similarly to strap 44, and the contiguous ends of said parts, below the trough, are bent outwardly to form parallel, spaced apart ears 60 connected by a bolt 62, whereby the strap may be tensioned and end wall 54 secured firmly in place.

The "barrier" limiting access of livestock to trough 32 consists of an upper cable 64 and a lower cable 66 extending horizontally the full length of the trough and supported at the upper portions of posts 4, which extend well above the trough. Said cables are supported on each of said posts by an angle iron bracket 68 best shown in FIGS. 3 and 6, said bracket extending longitudinally of the post and being welded thereto with its apex extending outwardly. A series of vertically spaced apart notches 70 are formed in said bracket, opening through the apex thereof, and cables 64 and 66 may be positioned selectively in any of said notches, being releasably secured therein by means of a keeper pin 72 inserted longitudinally through bracket 68 as shown. At each end of the trough, outwardly from the endmost frame 2, each of cables 64 and 66 is connected by means of an adjustable turnbuckle 74 to an anchor stake 76 affixed securely in the ground. Said turnbuckles serve to maintain the cables taut regardless of the variable elevation of said cables, and said cables also serve to stabilize the entire assembly.

The usage of the apparatus is believed apparent. Livestock animals may extend their heads and necks under cable 66 to gain access to food in trough 32. It will be noted that the rearward edge of the trough is substantially higher than the forward edge, this arrangement tending to prevent animals from pushing feed out of the trough over its rearward edge. Depending on the size of the animals being fed, cable 66 is set at an elevation sufficient to permit access to the trough as described, but low enough to prevent any animal from raising his forequarters sufficiently to permit him to climb into the trough. Upper cable 64 is set sufficiently high to eliminate any possibility that an animal could climb over it into the trough. More than two cables could of course be utilized if desired, although two have been found entirely adequate. The animals are thus limited to access to the trough from one side only, leaving the other side free for access by trucks delivering feed to the trough. The animals may be prevented from walking around the ends of the apparatus by disposing the endmost frames 2 immediately adjacent other fences or barriers.

While we have shown and described a specific embodiment of our invention, it will be readily apparent that many minor changes of structure and operation could be made without departing from the spirit of the invention as defined by the scope of the appended claim.

What we claim as new and desire to protect by Letters Patent is:

A livestock feeding apparatus comprising:
(a) a series of independent frames each consisting of:
  (1) a vertical post and
  (2) a cradle member affixed to said post and extending horizontally therefrom, said post extending upwardly from said cradle member,
(b) means for affixing said frames independently relative to the ground whereby said posts are disposed in a line and said cradle members extend transversely in the same direction from said line,
(c) a trough extending parallel to said line of posts and supported in said cradle members, and
(d) a horizontally extending flexible barrier attached to the upwardly extended portions of said posts above said trough, said barrier being sufficiently elevated to give animals access to said trough by extending their heads and necks therebeneath, said barrier including cables that are adjustably anchored with the ground whereby the apparatus is maintained in a stationary position.

References Cited by the Examiner

UNITED STATES PATENTS

| | | | |
|---|---|---|---|
| 424,020 | 3/90 | Nisson | 119—63 |
| 646,809 | 4/00 | Dickman | 119—61 |
| 1,338,077 | 4/20 | Hector | 119—61 |
| 1,889,469 | 11/32 | Gardiner | 119—63 |
| 1,918,729 | 7/33 | Whitmer | 119—61 |
| 2,204,556 | 6/40 | Ahles | 256—13.1 |
| 3,082,739 | 3/63 | Schloemer | 119—61 |

SAMUEL KOREN, *Primary Examiner.*
CARL W. ROBINSON, HUGH R. CHAMBLEE,
*Examiners.*